(12) United States Patent
Weiss et al.

(10) Patent No.: US 12,734,978 B2
(45) Date of Patent: Sep. 15, 2026

(54) ARRANGEMENT OF A MOTOR VEHICLE SENSOR DEVICE

(71) Applicant: Dr. Ing. h.c. F. Porsche Aktiengesellschaft, Stuttgart (DE)

(72) Inventors: Thomas Weiss, Calw-Heumaden (DE); Stephan Puchmueller, Friolzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 178 days.

(21) Appl. No.: 18/426,450

(22) Filed: Jan. 30, 2024

(65) Prior Publication Data

US 2024/0253581 A1 Aug. 1, 2024

(30) Foreign Application Priority Data

Feb. 1, 2023 (DE) ..................... 10 2023 102 399.3

(51) Int. Cl.

*B60R 13/08* (2006.01)
*B60R 11/00* (2006.01)
*G01S 7/521* (2006.01)
*G01S 15/931* (2020.01)

(52) U.S. Cl.

CPC .......... *B60R 13/0869* (2013.01); *B60R 11/00* (2013.01); *G01S 7/521* (2013.01); *G01S 15/931* (2013.01); *B60R 2011/0001* (2013.01); *B60R 2011/004* (2013.01); *B60R 2011/0094* (2013.01); *G01S 2015/938* (2013.01)

(58) Field of Classification Search

CPC ................. B60R 13/0869; B60R 11/00; B60R 2011/0001; B60R 2011/004; B60R 2011/0094; G01S 7/521; G01S 2015/938; G01S 15/931

See application file for complete search history.

(56) References Cited

U.S. PATENT DOCUMENTS 6,318,774 B1 * 11/2001 Karr ...................... B60R 19/483 293/102
7,240,555 B2 * 7/2007 Kawashima ............ G01S 7/521 73/632

(Continued)

OTHER PUBLICATIONS

Mitsubishi Chemical Advanced Materials, "PPS plastics", Oct. 1, 2023, obtained from https://web.archive.org/web/20231001175953/https://www.mcam.com/en/products/pps (Year: 2023).*

*Primary Examiner* — Brian Handville
(74) *Attorney, Agent, or Firm* — LEYDIG, VOIT & MAYER, LTD.

(57) ABSTRACT

An arrangement (1) is provided for holding of a motor vehicle sensor device (2) in a thermally exposed area near an exhaust system (5) of a motor vehicle. The motor vehicle sensor device (2) includes a sensor (10) and a holding device (3) having a receptacle (7), within which the sensor means is accommodated. The holding device (3) is fixed to an inner side (40) of an external paneling component (4) in the thermally exposed area. The motor vehicle sensor device (2) includes a cover (8), by means of which the receptacle (7) is covered on an interior side of the vehicle. The cover (8) is made of a thermally insulating material or has a thermally insulating coating.

17 Claims, 2 Drawing Sheets

(56) References Cited

U.S. PATENT DOCUMENTS

| | | | | |
|---|---|---|---|---|
| 7,357,431 | B2 * | 4/2008 | Sato | B60R 19/483 293/117 |
| 8,516,911 | B2 * | 8/2013 | Inoue | B60R 19/483 73/866.5 |
| 10,160,401 | B2 * | 12/2018 | Lang | B60R 11/04 |
| 10,254,401 | B2 * | 4/2019 | Suyama | G01S 7/521 |
| 2021/0031701 | A1 | 2/2021 | Kitagawa et al. | |
| 2022/0251749 | A1 * | 8/2022 | Borchardt | B60R 13/0876 |

* cited by examiner

ARRANGEMENT OF A MOTOR VEHICLE SENSOR DEVICE

CROSS-REFERENCE TO RELATED APPLICATION

This application claims priority on German Patent Application No 10 2023 102 399.3 filed Feb. 1, 2023, the entire disclosure of which is incorporated herein by reference.

BACKGROUND

Field of the Invention. The invention relates to an arrangement of a motor vehicle sensor device in a thermally exposed area near an exhaust system of a motor vehicle.

Related Art. The prior art includes motor vehicle sensor devices that have an ultrasonic sensor arranged in a through-opening of an external paneling component of the motor vehicle. The external paneling component can be a front bumper or a rear bumper of the motor vehicle. Such motor vehicle sensor devices are used for parking aids or other driving assistance systems. These sensor devices can be exposed to very high temperatures during operation, such as when the sensor device is in a thermally exposed area near an exhaust system of the motor vehicle. Thus, there is a possibility that the maximum allowable limit temperature for the operation of the sensor is exceeded, and a sensor malfunction or defect can occur.

US 2021/031701 A1 discloses a motor vehicle sensor device with a sensor attached to a body side portion so that an air gap is provided between the sensor and the sensor attachment. The air gap is intended to function as a heat barrier and shields the sensor against a hot exhaust system of a motor vehicle.

An object of the invention is to provide a simple and cost-efficient arrangement of a motor vehicle sensor device in a thermally exposed area of a motor vehicle that avoids exceeding the maximum permitted limit temperature for operation of the sensor.

SUMMARY OF THE INVENTION

An arrangement of a motor vehicle sensor device in accordance with this disclosure is configured to be disposed in a thermally exposed area near an exhaust system of a motor vehicle. The motor vehicle sensor device comprises a sensor and a holding device. The holding device has a receptacle within which the sensor is accommodated. The holding device of some embodiments can be fixed to an inner side of an external paneling component that is arranged in the thermally exposed area. The motor vehicle sensor device of some embodiments comprises a cover that covers the receptacle on an interior side of the vehicle. The cover is made of a thermally insulating material or comprises a thermally insulating coating.

The cover has thermally insulating properties that prevent the cover from exceeding a maximum allowable limit temperature of the sensor of the motor vehicle sensor device. Thus, the cover prevents a malfunction or defect of the sensor in a simple and inexpensive manner.

The cover of one embodiment is made of a thermally insulating, heat-resistant plastic. The particular plastic used for the cover depends on the temperatures at the installation location of the motor vehicle sensor device, and the thermally insulating plastic is selected to be sufficiently heat-resistant to prevent exceeding the limit temperature for the operation of the sensor of the motor vehicle sensor device.

A thermally insulating plastic of some embodiments is heat-resistant to at least 200° C., preferably to at least 400° C., and in particular to at least 600° C.

In an alternate embodiment, the cover is made of a thermally insulating ceramic material.

In a further alternate, the cover has a thermally insulating ceramic coating.

Further features and advantages of the invention will become apparent from the following description of a preferred embodiment with reference to the drawing.

DETAILED DESCRIPTION

Figure 1:
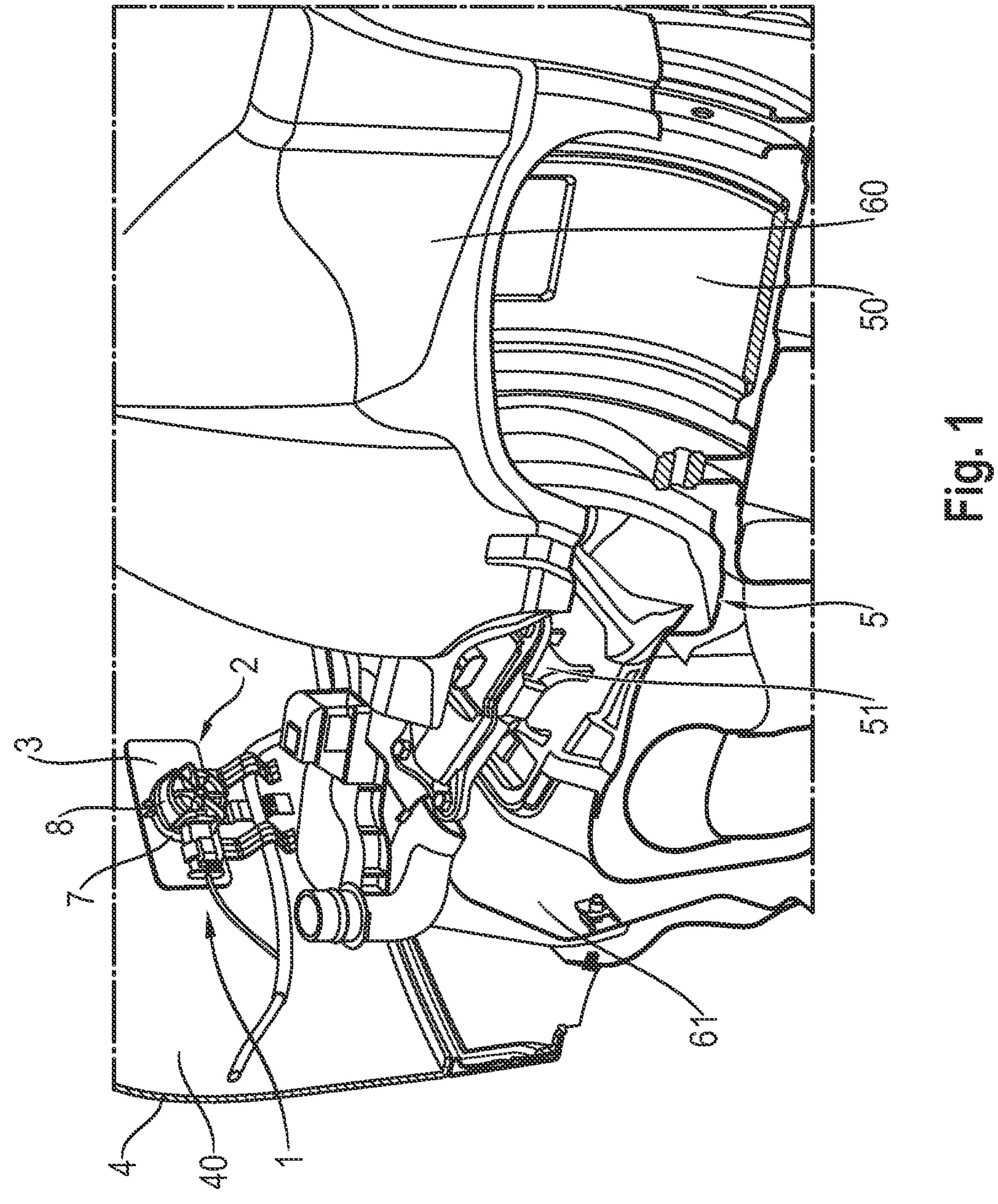
FIG. 1 is a perspective view of an arrangement of a motor vehicle sensor device in a thermally exposed area near an exhaust system of a motor vehicle.
Figure 2:
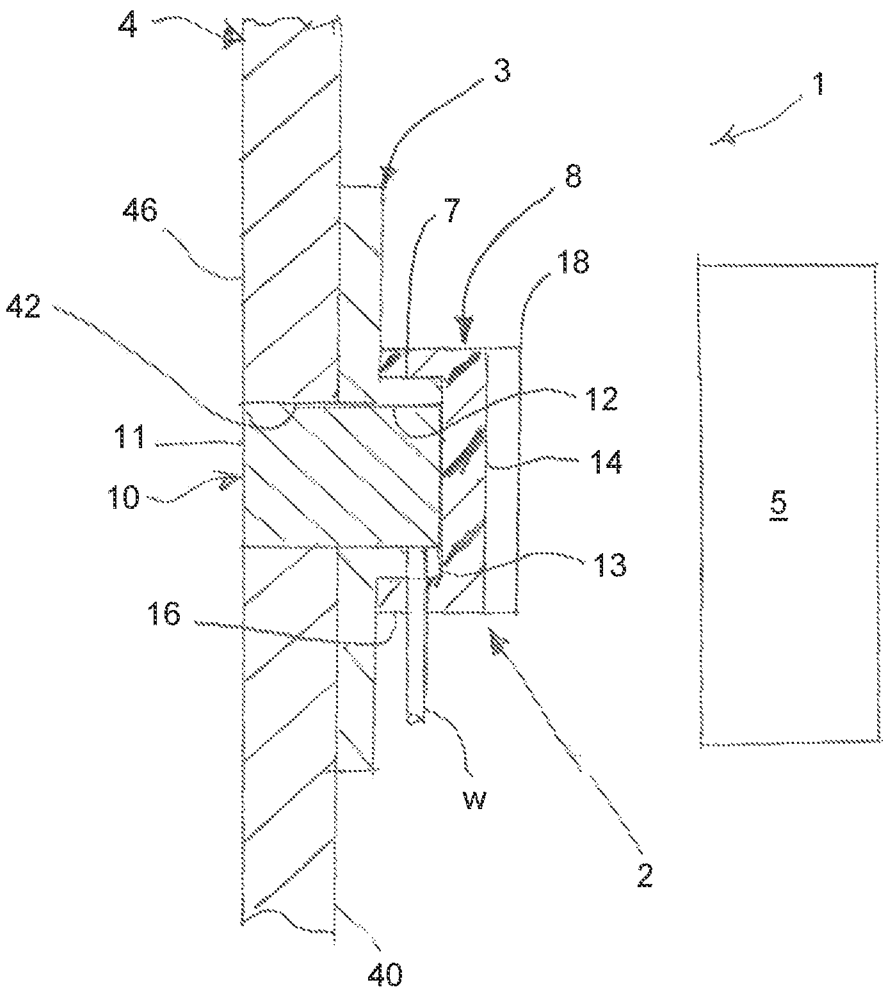
FIG. 2 is a schematic cross-section of the sensor device.

FIGS. 1 and 2 illustrate an arrangement 1 of a motor vehicle sensor device 2 in a thermally exposed area near an exhaust system 5 of a motor vehicle. In the present case, the motor vehicle sensor device 2 is a portion of a driver assistance system of the motor vehicle, in particular a parking aid, and comprises a sensor 10, such as a proximity sensor. The sensor 10 can be an ultrasonic sensor that is configured to emit and/or receive ultrasonic waves for identifying proximity to another object, such as another vehicle. A wire W extends from the sensor 10 to a control device on the vehicle. The sensor 10 is operative to detect obstacles in a close range of the motor vehicle and alerts a driver of the motor vehicle of impending collisions.

The motor vehicle sensor device 2 is attached to an inner side 40 of an external paneling component 4 of the motor vehicle. The external paneling component 4 of this embodiment can be a rear bumper or a rear fender located near the exhaust system 5 and thus in a thermally exposed area of the motor vehicle.

The exhaust system 5 shown in FIG. 1 comprises a main silencer 50, a flap adjuster 51 for an exhaust flap of the exhaust system 5, as well as exhaust cleaning components, such as catalytic converters and particulate filters. These components reach high temperatures during operation of a combustion engine upstream of the exhaust system 5. Thus, the main silencer 50, the flap adjuster 51, and exhaust gas cleaning components are each wrapped, at least in sections, with a metallic heat shield 60, 61.

The motor vehicle sensor device 2 comprises a sensor holding device 3 for holding the sensor 10, and the sensor holding device 3 is attached to an inner side 40 of the external paneling component 4. The sensor holding device 3 comprises a receptacle 7 that forms a receiving space 12 within which the sensor 10 is accommodated. The receptacle 7 comprises a wall 13 that laterally encloses the sensor 10 accommodated within the receiving space 12 in an annular manner.

The motor vehicle sensor device 2 further comprises a cover 8 that is configured to close the receiving space of the receptacle 7 on the inside of the vehicle. The cover 8 comprises a cover bottom 14 and an annular side wall 16. The cover 8 is shaped so that the side wall 16 of the cover 8 encompasses the wall 13 of the receptacle 7 of the sensor holding device 3 surrounded by the receiving space 12 after assembly. The receptacle 7 of the sensor holding device 3 as well as the cover 8 are configured so that the cover 8 can be locked to the sensor holding device 3 during assembly. Other types of attachment are generally conceivable. To increase bending stiffness, the cover 8 in the embodiment shown in FIG. 2 is provided with several reinforcing ribs 18.

The external paneling component 4 has a through-opening 42, as shown schematically in FIG. 2. The sensor 10 of the motor vehicle sensor device 2 extends into the through-opening 42 after assembly to such an extent that an outer sensor surface 11 is flush with an outer side 46 of the external paneling portion 4.

As mentioned above, very high temperatures occur in the area of the exhaust system 5 during operation of the combustion engine. The cover 8 is configured to have thermally insulating properties to prevent a maximum allowable limit temperature for the operation of the sensor 10 of the motor vehicle sensor device 1 from being exceeded, thereby preventing a temperature-related malfunction or defect of the sensor 10.

For this purpose, the cover 8 can be made entirely from a thermally insulating material or can comprise a thermally insulating coating. For example, the cover 8 is made of a thermally insulating, heat-resistant plastic. Depending on the temperatures at the installation location of the motor vehicle sensor device 1, a thermally insulating plastic is selected that is sufficiently heat-resistant and prevents exceeding the limit temperature for the operation of the sensor 10 of the motor vehicle sensor device 1. For example, the cover 8 is made of a thermally insulating plastic that is heat-resistant to at least 200° C., preferably to at least 400° C., and in particular to at least 600° C. Alternatively, the cover 8 can be made of a ceramic material or can comprise a coating of a ceramic material.

The invention claimed is:

1. An arrangement, comprising:

a motor vehicle sensor device in a thermally exposed area near an exhaust system of a motor vehicle, the motor vehicle sensor device comprising:

a sensor;

a holding device having a receptacle within which the sensor is accommodated, the receptacle having an opening that opens away from an inner side of an outer cover component that is arranged in the thermally exposed area and that opens toward an interior side of the vehicle, wherein the holding device is fixed to the inner side of the outer cover component; and a cover that covers the opening of the receptacle and an annular wall of the receptacle on the interior side of the vehicle, the cover being made of a thermally insulating material or comprising a thermally insulating coating.

2. The arrangement of claim 1, wherein the cover is made of a thermally insulating, heat-resistant plastic.

3. The arrangement of claim 2, wherein the plastic is heat-resistant to at least 200° C.

4. The arrangement of claim 1, wherein the cover is made of a thermally insulating ceramic material.

5. The arrangement of claim 1, wherein the thermally insulating material of the cover is a ceramic coating.

6. The arrangement of claim 1, wherein the sensor has an outer sensor surface that is flush with an outer side of the outer cover component.

7. The arrangement of claim 6, wherein the outer side of the outer cover component forms at least part of an outermost periphery of the motor vehicle.

8. The arrangement of claim 6, wherein the sensor is an ultrasonic sensor configured to emit and/or receive ultrasonic waves through the outer sensor surface.

9. The arrangement of claim 1, wherein the sensor includes a wire that extends through the cover to a controller.

10. The arrangement of claim 9, wherein the wire of the sensor also extends through the annular wall of the receptacle.

11. The arrangement of claim 9, wherein the wire extends through the cover parallel to a portion of the cover that directly covers the opening of the receptacle.

12. The arrangement of claim 1, wherein the cover includes a plurality of reinforcing ribs arranged on a side of the cover opposite the sensor.

13. The arrangement of claim 12, wherein at least one of the plurality of reinforcing ribs extends across the entire side of the cover opposite the sensor.

14. The arrangement of claim 1, wherein the cover includes an annular wall configured to surround and abut the annular wall of the receptacle.

15. The arrangement of claim 1, wherein the outer cover component has an outer side opposite the inner side, the outer side being in exposed to an external environment of the motor vehicle.

16. The arrangement of claim 15, wherein the holding device includes a flange extending along the inner side of the outer cover component and extending away from the sensor.

17. The arrangement of claim 16, wherein the flange of the holding device and the annular wall of the receptacle of the holding device extend orthogonally relative to one another.

* * * * *